United States Patent [19]

Acres

[11] 4,218,836
[45] Aug. 26, 1980

[54] SPEECH THERAPY

[76] Inventor: Penelope A. Acres, 53 Dorothy Rd., Norwood, Johannesburg, Transvaal Province, South Africa

[21] Appl. No.: 15,913

[22] Filed: Feb. 28, 1979

Related U.S. Application Data

[63] Continuation of Ser. No. 828,779, Aug. 29, 1977, abandoned.

[30] Foreign Application Priority Data

Aug. 27, 1976 [ZA] South Africa ............ 76/5171

[51] Int. Cl.³ .................................................. G09B 19/04
[52] U.S. Cl. ....................................................... 35/35 R
[58] Field of Search .................. 35/35 R, 35 H, 17, 59

[56] References Cited

U.S. PATENT DOCUMENTS

| 660,255 | 10/1900 | Kingma | 35/35 H |
|---|---|---|---|
| 2,438,246 | 3/1948 | Henry | 35/59 |
| 3,148,461 | 9/1964 | Johnson | 35/35 R X |

FOREIGN PATENT DOCUMENTS

| 440084 | 12/1935 | United Kingdom | 35/35 R |
|---|---|---|---|
| 1378710 | 12/1974 | United Kingdom | 35/35 R |
| 1419600 | 12/1975 | United Kingdom | 35/35 R |

Primary Examiner—William H. Grieb
Attorney, Agent, or Firm—Stevens, Davis, Miller & Mosher

[57] ABSTRACT

This invention relates to speech therapy wherein a speech teaching aid is provided comprising at least one two dimensional frontal outline of human face, the outline including a representation of vocal apparatus corresponding to the configuration of the vocal apparatus of a person when a particular phonetic sound is being made. The aid may be applied to a mirrored surface so that a comparison can be made by the patient of his facial expression with that of the aid.

2 Claims, 6 Drawing Figures

SPEECH THERAPY

This is a continuation of application Ser. No. 828,779 filed Aug. 29, 1977 now abandoned.

This invention relates to a method of speech therapy and a teaching aid therefor. More particularly the invention is concerned with articulatory disabilities in patients.

There are several communication channels which are used in speech therapy and these include the auditory, tactile, kinesthetic and visual channels. The visual channel involves sight and perception and methods employing the visual channel concentrate on teaching the patient to pick out visual clues and to use these clues as a basis for vocal improvement. Most of these visual methods are, however, complicated and of limited application because they do not show the patient how to produce sounds, but rather demonstrate what happens when a sound is made.

An object of this invention is to provide a teaching aid for use in speech therapy and a visual method of speech therapy utilizing the aid.

According to the invention a teaching aid for use in speech therapy comprises at least one two dimensional frontal outline of human face, the outline including a representation of vocal apparatus corresponding to the configuration of the vocal apparatus of a person when a particular phonetic sound is being made.

Further according to the invention the outline and representation may be done on a transparent background which is adapted to be fixed in front of a mirror or the outline representation may be done directly onto a mirrored surface; the teaching aid may have one facial outline for teaching a single phonetic sound, or a plurality of outlines for teaching a combination of phonetic sounds; and the representation may include instruction signs for vocal apparatus or air control.

Still further according to the invention the outlines may have phonetic signs or letters of the alphabet corresponding to the phonetic sound or combination of phonetic sounds associated therewith.

The invention also provides a method of speech therapy comprising teaching a patient to copy with his vocal apparatus the representations of vocal apparatuses in one or more teaching aids.

Further according to this aspect of the invention the teaching aid is of the type defined having a transparent background and is fixed on the front of a mirror.

Further features of the invention will become apparent from the example of the invention discussed below. This example is by way of example only and reference is made to the accompanying drawings.

This example relates to speech therapy for teaching patients to speak in the English language. The invention may however be adapted for use in any language.

Figure 1:
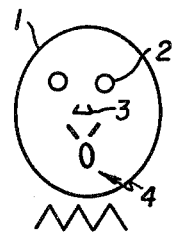
FIG. 1 is a frontal view of an embodiment of the invention.
Figure 2:
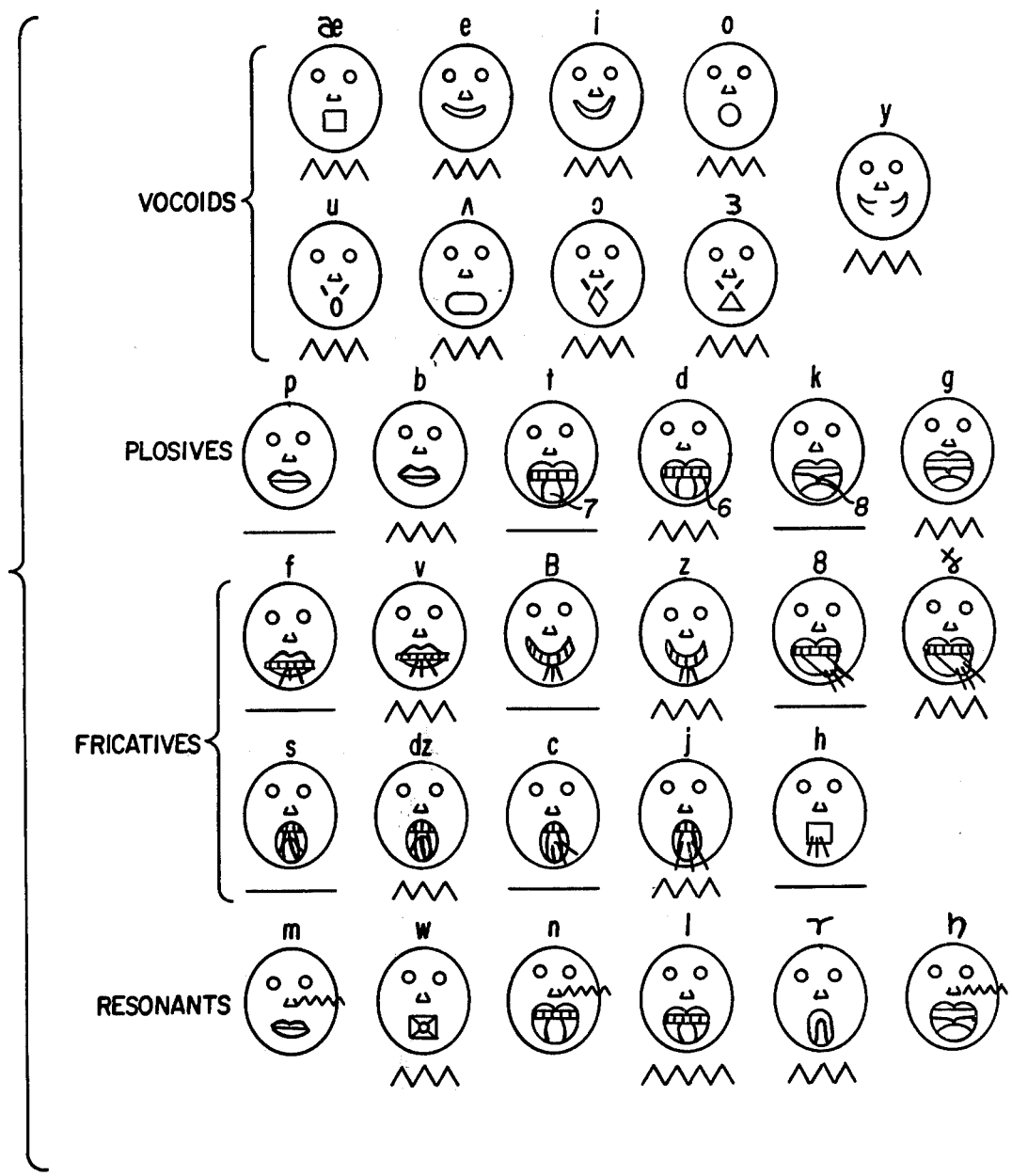
FIG. 2 is a plurality of frontal views of other embodiments of the invention.

A teaching aid for use in speech therapy is as generally shown in FIG. 1 and comprises a plurality of simple frontal facial outlines 1, each of which includes eyes 2, a nose 3 and a mouth or vocal apparatus 4. Whereas the eyes and nose of each outline 1 remains unchanged, the representation of the vocal apparatuses 4 changes such that in each outline it corresponds to a human mouth uttering a particular phonetic sound. Thus, in FIG. 1 representing the phonetic sound "u" only the lips 5 of the vocal apparatus are represented whereas other sounds may require representation of the teeth 6, tongue 7 and soft palate 8 as shown in the various outlines of FIG. 2.

Instruction signs for instructing the patient on the use of his vocal apparatus and the air control required may be associated with the representation of the vocal apparatuses. The following instruction signs are envisaged:

(a) Voicing at larynx level. Long  short 
(b) Nasality at nose level 
(c) Voicelessness at larynx level. Long _____ short _____
(d) Fricatives 
(e) Inspiration 
(f) Aspiration 
(g) Trill 
(h) Lip Rounding 
(i) Soft Palate 
(j) Lip spreading 

whereas intersecting facial outlines may be used to indicate dipthongs.

These features are shown in FIGS. 2,3,4 and 5 together with representation for the various phonemes. Thus in FIG. 2 the vocoids including the 'y' phonem, plosives, fricatives and resonants are depicted in facial outlines. While in FIG. 3 the 'y' phonem is depicated in combination with the various vocoids of FIG. 2.

Figure 4:
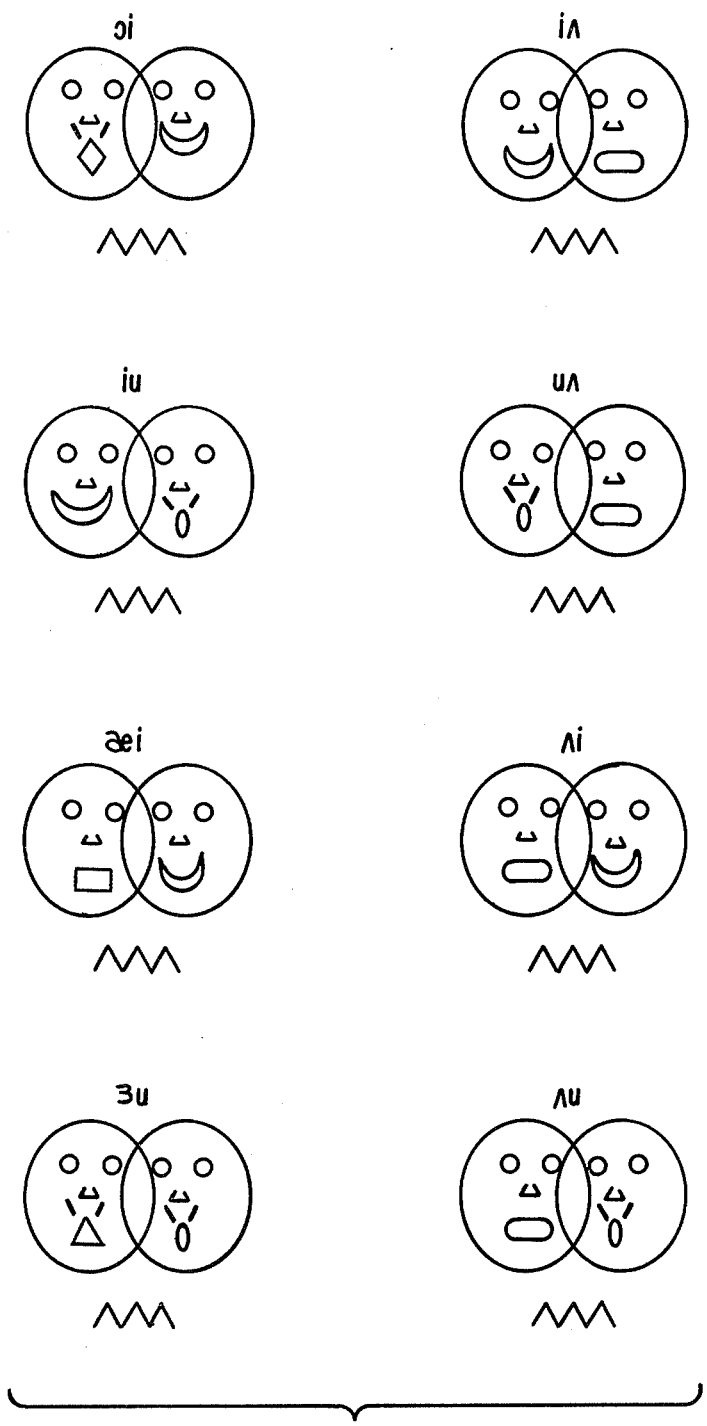
FIG. 4 is a plurality of frontal views of still other embodiments of the invention.
Figure 5:
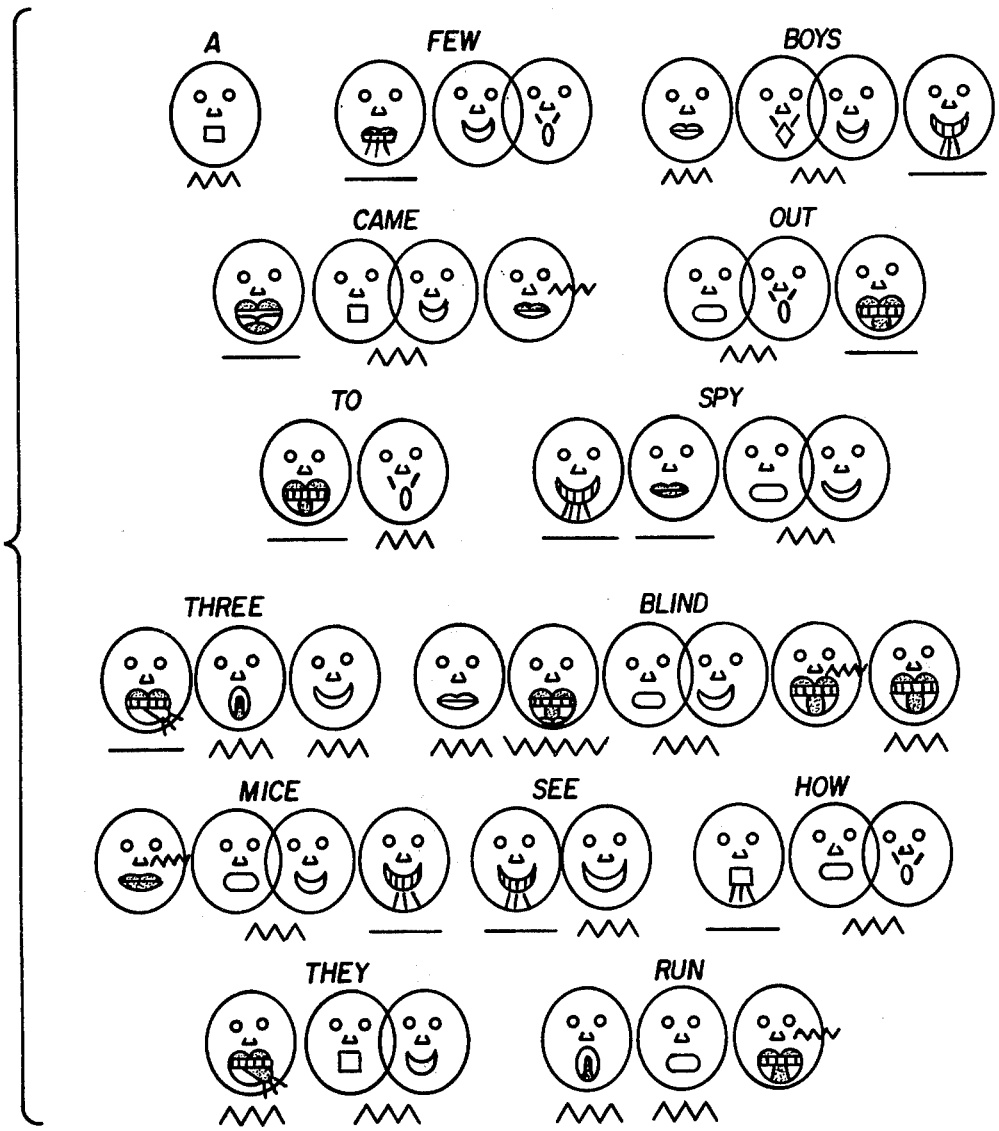
FIG. 5 is a plurality of frontal views of still other embodiments of the invention.

To represent the dipthongs two facial outlines are made in an overlapping configuration in order to represent the continuity of the sound. Facial outlines for the dipthongs are illustrated in FIG. 4. FIG. 5 on the other hand, shows how combinations of the representations and hence phonetic sounds may be used to form words and sentences. In use the vocal apparatus representations are followed by the patient who forms his own vocal apparatus to conform therewith. The instruction signs are followed where necessary to produce the particular sound required.

Figure 6:
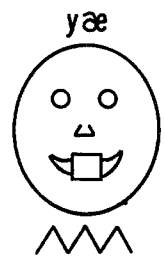
FIG. 6 is a perspective view of still other embodiments of the invention.
Figure 6:
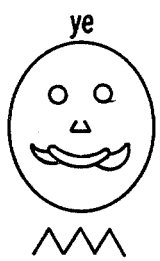
Figure 6:
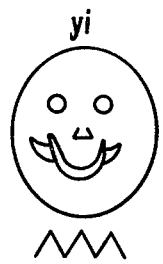
Figure 6:
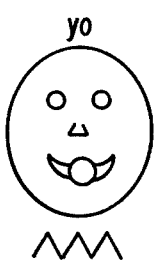
Figure 6:
Figure 6:
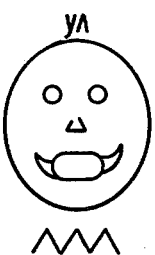
Figure 6:
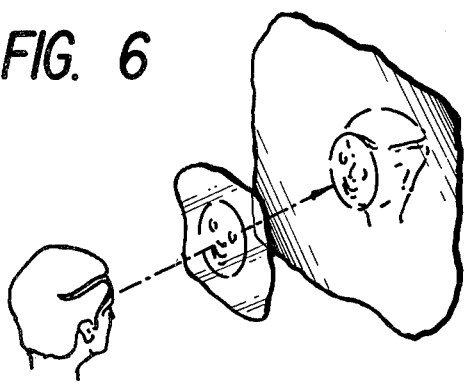
Figure 3:
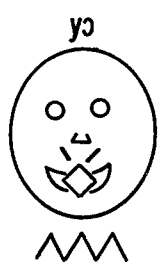
FIG. 3 is a plurality of frontal views of still other embodiments of the invention.
Figure 3:
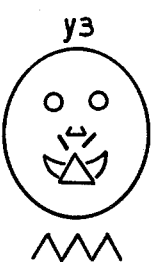

To enable the patient to follow the representation in the easiest manner they are made in the form of outlines on a transparent material, such as a suitable plastics, which is then placed in front of and adjacent to a mirrored surface (FIG. 6). Alternatively, the representations may be made directly onto a mirrored surface such as a glass or plastics mirror.

Preferably the representations are as large as an average sized head. In this way, the patient may superimpose the representation on the image of his own face in the mirror and may thus more easily bring his vocal apparatus into accord with that of the representation.

The representations may, of course, be produced on opaque background in the form of cards, charts and the like.

Experimental work using the teaching and the method of the invention has produced good results.

Other embodiments and uses are envisaged within the scope of the invention, including its application to speech therapy in other languages.

What I claim as new and desire to secure by Letters Patent document is:

1. A teaching aid for use in speech therapy for a student, said teaching aid comprising:
    a mirror; and
    at least one two dimensional full frontal outline of a human face, the outline including a representation of vocal apparatus corresponding to the configuration of the vocal apparatus of a person when a particular phonetic sound is being made, said representation including an open mouth and at least the soft palate used in making the designated sound;
    a phonetic alphabetical representation or symbol of the particular phonetic sound associated with the outline; and
    a transparent background on which are disposed the outline and the representation or symbol, said background being removably secured in front of said mirror so that the student can make the particular phonetic sound and compare the configuration of his vocal apparatus, which is reflected from the mirror, with that on the transparent background.

2. A teaching aid as claimed in claim 1 in which the representation or symbol includes instruction signs for vocal apparatus or air control from the mouth or nose.

* * * * *